US012800519B2

(12) United States Patent
Matsuda et al.

(10) Patent No.: US 12,800,519 B2
(45) Date of Patent: Nov. 17, 2026

(54) RADIOGRAPHY SYSTEM, RADIOGRAPHY METHOD, AND RADIOGRAPHY PROGRAM

(71) Applicant: FUJIFILM CORPORATION, Tokyo (JP)

(72) Inventors: Hidenori Matsuda, Kanagawa (JP); Koichi Kitano, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 94 days.

(21) Appl. No.: 19/023,415

(22) Filed: Jan. 16, 2025

(65) Prior Publication Data

US 2025/0271365 A1 Aug. 28, 2025

(30) Foreign Application Priority Data

Feb. 26, 2024 (JP) ................................ 2024-026726

(51) Int. Cl.
*G01N 23/04* (2018.01)

(52) U.S. Cl.
CPC ..... *G01N 23/043* (2013.01); *G01N 2223/401* (2013.01); *G01N 2223/406* (2013.01)

(58) Field of Classification Search
CPC ... A61B 6/4291; A61B 6/4452; A61B 6/4464; A61B 6/487; A61B 6/545; G01N 2223/401; G01N 2223/406; G01N 23/043
See application file for complete search history.

(56) References Cited

U.S. PATENT DOCUMENTS

2004/0228439 A1* 11/2004 Tsujii ....................... A61B 6/06 378/62
2010/0104165 A1* 4/2010 Takahashi ............ A61B 6/5282 382/132
2011/0200169 A1* 8/2011 Oikawa ................ A61B 6/4291 378/42
2011/0228904 A1* 9/2011 Iwakiri ................ A61B 6/4233 378/62
2012/0063699 A1* 3/2012 Fujita .................. A61B 6/4291 382/275
2012/0128119 A1* 5/2012 Notohara .............. A61B 6/025 378/10
2017/0287582 A1* 10/2017 Kotian ................... A61B 6/032
2018/0333128 A1* 11/2018 Obara .................. A61B 6/4291
2019/0302278 A1* 10/2019 Tamura .................. A61B 6/025
2021/0383514 A1* 12/2021 Kitano ................... A61B 6/025

FOREIGN PATENT DOCUMENTS

JP 2010-104517 A 5/2010

OTHER PUBLICATIONS

Extended European Search Report dated May 26, 2025, issued in corresponding EP Patent Application No. 25159520.3.

* cited by examiner

*Primary Examiner* — David J Makiya
*Assistant Examiner* — Soorena Kefayati
(74) *Attorney, Agent, or Firm* — SOLARIS Intellectual Property Group, PLLC

(57) ABSTRACT

A radiography system capable of executing fluoroscopy in which a plurality of radiation images are continuously captured at a predetermined frame rate and general imaging in which one radiation image is recorded in a switchable manner, the radiography system selects the fluoroscopy or the general imaging as an imaging mode of the radiation image based on information related to a grid used in capturing the radiation image.

7 Claims, 8 Drawing Sheets

FIG. 7

69

| PRESENCE OR ABSENCE OF MARKER | COLOR OF MARKER | GRID INFORMATION | | IMAGING MODE | IMAGING CONDITION | IMAGING PROCESSING CONDITION |
|---|---|---|---|---|---|---|
| | | PRESENCE OR ABSENCE | TYPE | | | |
| ABSENCE | - | ABSENCE | - | GENERAL IMAGING | IMAGING CONDITION A | IMAGING PROCESSING CONDITION A |
| PRESENCE | WHITE | PRESENCE | GRID A | FLUOROSCOPY | IMAGING CONDITION B | IMAGING PROCESSING CONDITION B |
| PRESENCE | YELLOW | PRESENCE | GRID B | FLUOROSCOPY | IMAGING CONDITION C | IMAGING PROCESSING CONDITION C |
| PRESENCE | BLUE | PRESENCE | GRID C | FLUOROSCOPY | IMAGING CONDITION D | IMAGING PROCESSING CONDITION D |
| ... | ... | ... | ... | ... | ... | ... |

FIG. 10

| | | GRID INFORMATION | | | | 69 |
|---|---|---|---|---|---|---|
| PRESENCE OR ABSENCE OF MARKER | COLOR OF MARKER | PRESENCE OR ABSENCE | TYPE | IMAGING MODE | IMAGING CONDITION | IMAGING PROCESSING CONDITION |
| ABSENCE | – | ABSENCE | – | GENERAL IMAGING | IMAGING CONDITION A | IMAGING PROCESSING CONDITION A |
| PRESENCE | WHITE | PRESENCE | GRID A | FLUOROSCOPY | IMAGING CONDITION B1 | IMAGING PROCESSING CONDITION B1 |
| | | | | FLUOROSCOPY | IMAGING CONDITION B2 | IMAGING PROCESSING CONDITION B2 |
| ... | ... | ... | ... | ... | ... | ... |

FIG. 13

69

| PRESENCE OR ABSENCE OF MARKER | COLOR OF MARKER | GRID INFORMATION | | IMAGING MODE | IMAGING CONDITION | IMAGING PROCESSING CONDITION |
|---|---|---|---|---|---|---|
| | | PRESENCE OR ABSENCE | TYPE | | | |
| ABSENCE | - | ABSENCE | - | GENERAL IMAGING | IMAGING CONDITION A | IMAGING PROCESSING CONDITION A |
| PRESENCE | WHITE | PRESENCE | GRID A | FLUOROSCOPY | IMAGING CONDITION B1 | IMAGING PROCESSING CONDITION B1 |
| PRESENCE | YELLOW | PRESENCE | GRID A | FLUOROSCOPY | IMAGING CONDITION B2 | IMAGING PROCESSING CONDITION B2 |
| ... | ... | ... | ... | ... | ... | ... |

RADIOGRAPHY SYSTEM, RADIOGRAPHY METHOD, AND RADIOGRAPHY PROGRAM

CROSS-REFERENCE TO RELATED APPLICATIONS

This application claims priority from Japanese Patent Application No. 2024-026726, filed on Feb. 26, 2024, the entire disclosure of which is incorporated herein by reference.

BACKGROUND

1. Technical Field

The present disclosure relates to a radiography system, a radiography method, and a radiography program.

2. Description of the Related Art

JP2010-104517A discloses a radiation image processing apparatus that performs image processing on a radiation image obtained by performing radiography in a radiography apparatus comprising a grid for removing scattered rays from a subject on a front surface of a radiation detection unit. The radiation image processing apparatus extracts a first grid image component caused by a grid from first image data obtained by performing radiography without a subject. In addition, the radiation image processing apparatus extracts a second grid image component caused by a grid from second image data obtained by performing the radiography through the subject. Then, the radiation image processing apparatus calculates a two-dimensional distribution of the amount of the scattering component by comparing the first grid image component with the second grid image component.

SUMMARY

In a medical field, for example, fluoroscopy is performed for the purpose of assisting in an examination such as a gastric barium examination and a cystography, or a treatment such as orthopedic reduction. In addition, even in a case where the purpose is to assist in the examination or the treatment, general imaging may be performed in addition to the fluoroscopy to leave one radiation image for recording. In this case, since the efficiency of the radiographic imaging can be improved, it is preferable that the fluoroscopy and the general imaging can be executed in a switchable manner by one system. The fluoroscopy means continuously capturing a plurality of radiation images at a predetermined frame rate (that is, video image capturing). In addition, the general imaging means recording one radiation image according to an imaging instruction from a user such as a radiologist (that is, still image capturing).

In a radiography system that executes fluoroscopy and general imaging in a switchable manner, in a case in which a user switches an imaging mode between fluoroscopy and general imaging each time imaging is performed, the efficiency of radiographic imaging is reduced.

The present disclosure has been made in view of the above circumstances, and an object of the present disclosure is to provide a radiography system, a radiography method, and a radiography program that can suppress a decrease in the efficiency of radiographic imaging.

According to a first aspect, there is provided a radiography system capable of executing fluoroscopy in which a plurality of radiation images are continuously captured at a predetermined frame rate and general imaging in which one radiation image is recorded in a switchable manner, the radiography system comprising at least one processor, in which the processor is configured to select the fluoroscopy or the general imaging as an imaging mode of the radiation image based on information related to a grid used in capturing the radiation image.

According to a second aspect, in the radiography system according to the first aspect, the processor is configured to set, based on the information related to the grid, an imaging condition in the selected imaging mode or an image processing condition for a radiation image obtained by imaging in the selected imaging mode.

According to a third aspect, in the radiography system according to the first or second aspect, the processor is configured to specify the information related to the grid based on an image obtained by imaging the grid or an output of a sensor for discriminating the grid.

According to a fourth aspect, in the radiography system according to the second aspect, the information related to the grid includes a type of the grid, a plurality of different imaging conditions or a plurality of different image processing conditions are associated with one type of grid, and the processor is configured to specify one imaging condition or one image processing condition from among the plurality of imaging conditions or the plurality of image processing conditions associated with the type of the grid based on an image obtained by imaging the grid.

According to a fifth aspect, in the radiography system according to the second aspect, the information related to the grid includes a type of the grid, a plurality of different imaging conditions or a plurality of different image processing conditions are associated with one type of the grid, and the processor is configured to present the plurality of imaging conditions or the plurality of image processing conditions associated with the specified type of the grid to the user; receive one imaging condition or one image processing condition selected by the user; and set the received imaging condition or received image processing condition.

According to a sixth aspect, there is provided a radiography method for a radiography system including at least one processor and capable of executing fluoroscopy in which a plurality of radiation images are continuously captured at a predetermined frame rate and general imaging in which one radiation image is recorded in a switchable manner, the radiography method comprises selecting the fluoroscopy or the general imaging as an imaging mode of the radiation image based on information related to a grid used in capturing the radiation image.

According to a seventh aspect, there is provided a radiography program for a radiography system including at least one processor and capable of executing fluoroscopy in which a plurality of radiation images are continuously captured at a predetermined frame rate and general imaging in which one radiation image is recorded in a switchable manner, the radiography program causing the processor to execute processing of: selecting the fluoroscopy or the general imaging as an imaging mode of the radiation image based on information related to a grid used in capturing the radiation image.

According to the present disclosure, it is possible to suppress a decrease in an efficiency of radiographic imaging.

BRIEF DESCRIPTION OF THE DRAWINGS

FIG. 7 is a diagram showing an example of grid data.

FIG. 10 is a diagram showing an example of grid data according to a modification example.

FIG. 13 is a diagram showing an example of grid data according to a modification example.

DETAILED DESCRIPTION

Hereinafter, exemplary embodiments for implementing the technique of the present disclosure will be described in detail with reference to the drawings.

Figure 1:
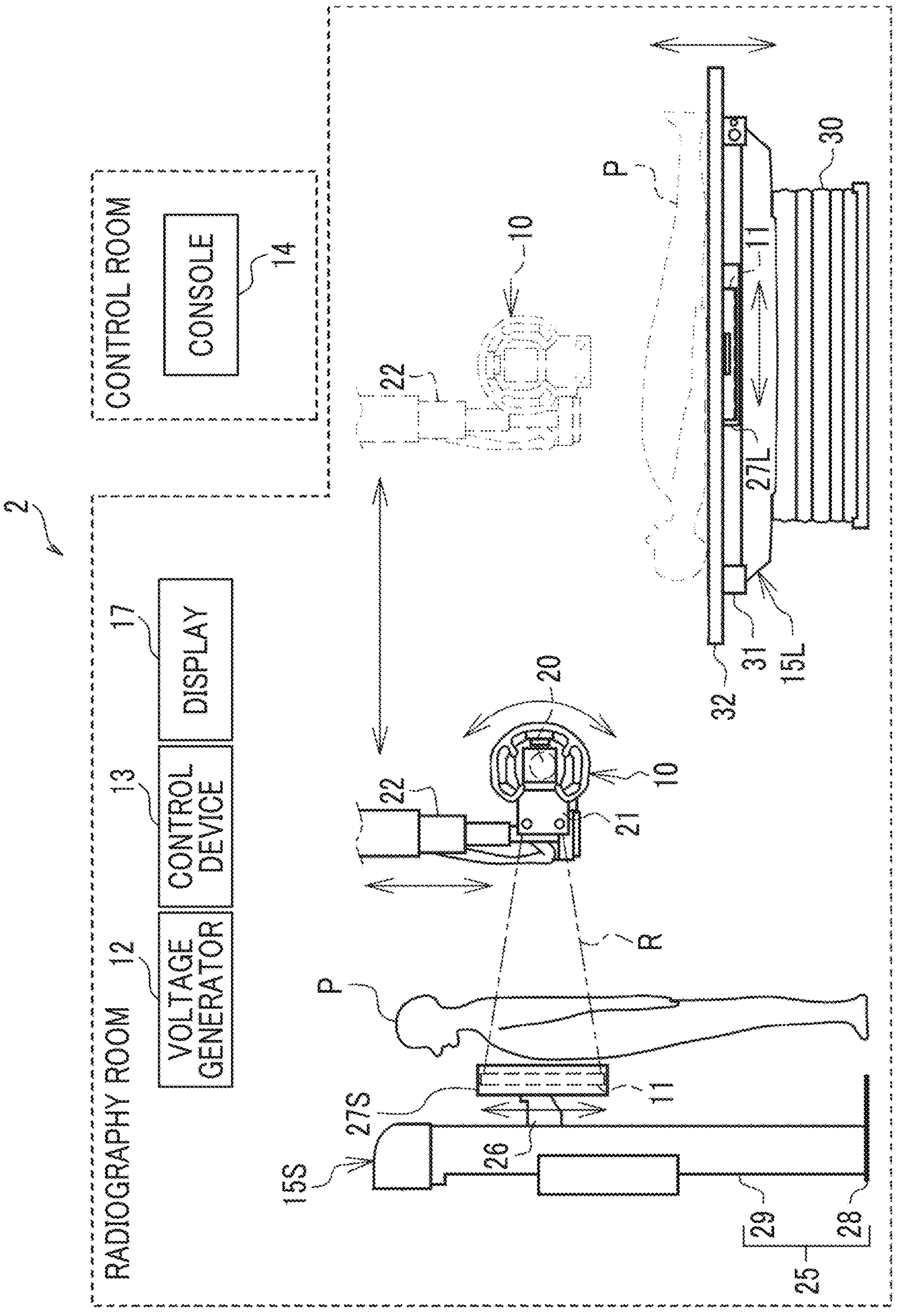
FIG. 1 is a diagram showing an example of a radiography system.

First, a configuration of a radiography system 2 will be described with reference to FIG. 1. As shown in FIG. 1, a radiography system 2 is a system that irradiates a patient P as an example of a subject with radiation R, such as X-rays or γ-rays, and captures a radiation image of the patient P, and is operated by an operator (hereinafter, referred to as an "imaging operator") of radiographic imaging, such as a radiologist. The radiography system 2 is capable of executing fluoroscopy in which a plurality of radiation images are continuously captured at a predetermined frame rate and general imaging that records one radiation image in a switchable manner. The radiography system 2 includes a radiation source 10, a radiation detector 11, a voltage generator 12, a control device 13, a console 14, an upright imaging stand 15S, a decubitus imaging table 15L, and a display 17. The radiation source 10, the radiation detector 11, the voltage generator 12, the control device 13, the upright imaging stand 15S, the decubitus imaging table 15L, and the display 17 are installed in, for example, a radiography room of a medical facility. On the other hand, the console 14 is installed in, for example, a control room adjacent to the radiography room. One radiation source 10 and one radiation detector 11 are prepared, and are used in common in the upright imaging stand 15S and the decubitus imaging table 15L.

The radiation source 10 includes a radiation tube 20 that emits the radiation R and an irradiation field limiter (also referred to as a collimator) 21 that limits an irradiation field of the radiation R. The radiation tube 20 is provided with, for example, a filament, a target, a grid electrode, and the like. A voltage is applied between the filament as a cathode and the target as an anode from the voltage generator 12. The voltage that is applied between the filament and the target is referred to as a tube voltage. The filament releases thermoelectrons according to the applied tube voltage toward the target. The target radiates the radiation R with collision of the thermoelectrons released from the filament. The grid electrode is disposed between the filament and the target. The grid electrode changes a flow rate of the thermoelectrons from the filament toward the target according to the voltage applied from the voltage generator 12. The flow rate of the thermoelectrons from the filament toward the target is referred to as a tube current.

An incident opening through which the radiation R from the radiation tube 20 is incident and an exit opening through which the radiation R exits are formed in the irradiation field limiter 21. Four shielding plates are provided in the vicinity of the exit opening. The shielding plate is formed of a material that shields the radiation R, for example, lead. The shielding plates are each disposed on each side of a quadrangle, in other words, are assembled in a checkered pattern and form a quadrangular irradiation opening through which the radiation R is transmitted. The irradiation field limiter 21 changes a size of the irradiation opening by changing a position of each shielding plate, thereby changing an irradiation field of the radiation R.

The radiation source 10 is suspended from a ceiling of the radiography room by a support column 22. The support column 22 is attached to a rail turned around the ceiling through a wheel. The support column 22 and the radiation source 10 are movable in a horizontal direction in the radiography room by the rail and the wheel. The support column 22 is extendable in a height direction, and accordingly, the radiation source 10 is movable in the height direction. The radiation source 10 is rotatable with respect to the support column 22 with an axis orthogonal to a paper surface as a rotation axis.

The radiation detector 11 is portable, and detects the radiation R transmitted through the patient P to output the radiation image of the patient P. The radiation detector 11 transmits the radiation image to the console 14. The radiation detector 11 is used while being accommodated in the upright imaging stand 15S or the decubitus imaging table 15L. In addition, the radiation detector 11 may be used in a state of being removed from the upright imaging stand 15S or the decubitus imaging table 15L in the radiography room and held by the patient P, or may be used in a state of being placed under the patient P who is lying on a bed in a hospital room. FIG. 1 illustrates an aspect in which the radiation image of the chest of the patient P positioned in front of the upright imaging stand 15S is captured.

The voltage generator 12 generates a tube voltage to be applied to the radiation tube 20. The voltage generator 12 and the radiation tube 20 are connected by a voltage cable. The tube voltage generated by the voltage generator 12 is supplied to the radiation tube 20 through the voltage cable.

The control device 13 controls an operation of the radiation source 10 via the voltage generator 12 according to an irradiation condition of the radiation R. The irradiation condition includes the tube voltage and the tube current applied to the radiation tube 20 and an irradiation time of the radiation R. Further, instead of the tube current and the irradiation time, a product of the tube current and the irradiation time, that is, a so-called mAs value may be used as the irradiation condition. In the fluoroscopy, the control device 13 decides the irradiation condition in the next frame based on a dose of the radiation R that has reached the radiation detector 11, which is derived from the radiation image of the previous frame. As a result, the control device 13 performs dose control of the radiation R in each frame during irradiation with the radiation R in the fluoroscopy.

Each of a radiography start instruction and a radiography end instruction is input by an imaging operator to the control device 13 through an irradiation switch (not shown). The irradiation switch is installed in at least one of the control room or the radiography room. The irradiation switch may be a switch operated by a hand or a switch operated by a foot. In a case where the start instruction is input, the control device 13 operates the voltage generator 12 according to the irradiation condition to emit the radiation R from the radiation tube 20.

The console 14 has a function of allowing the imaging operator to confirm and input irradiation conditions of the radiation R, and a function of performing image processing on the radiation image obtained by the radiation detector 11. Examples of the console 14 include a computer such as a personal computer or a server computer.

The upright imaging stand 15S includes a stand 25, a connection portion 26, the upright posture holder 27S, and the like. The stand 25 is configured with a pedestal 28 that is installed on a floor surface of the radiography room, and a support column 29 that extends from the pedestal 28 in the height direction. The connection portion 26 connects the upright posture holder 27S to the stand 25. The connection portion 26 and the upright posture holder 27S are movable in the height direction with respect to the support column 29 and can perform height adjustment according to the height of the patient P or an imaging site.

The upright posture holder 27S has a box shape and accommodates the radiation detector 11 therein. The upright posture holder 27S is mostly formed of a conductive material having an electromagnetic wave shielding property, such as aluminum or stainless steel. The upright posture holder 27S has a front surface facing the radiation source 10, and the front surface is formed of a material transmitting the radiation R, such as carbon.

The decubitus imaging table 15L has a pedestal 30 that is installed on the floor surface of the radiography room, a connection portion 31, a top plate 32, the decubitus posture holder 27L, and the like. The connection portion 31 connects the top plate 32 to the pedestal 30. The pedestal 30 is of an elevating type, and thus heights of the top plate 32 and the decubitus posture holder 27L can be adjusted. The top plate 32 has a rectangular plate shape having a length and a width such that the patient P can lie, and is formed of a material transmitting the radiation R, such as carbon.

The decubitus posture holder 27L is disposed in a space between the pedestal 30 and the top plate 32 formed by the connection portion 31. The decubitus posture holder 27L has a box shape with a top covered with the top plate 32, and accommodates the radiation detector 11 therein. The decubitus posture holder 27L is formed of a conductive material having an electromagnetic wave shielding property, such as aluminum or stainless steel. The decubitus posture holder 27L is slidable in a direction along a longitudinal direction of the top plate 32 by a sliding mechanism.

The display 17 is a liquid crystal display or an electro luminescence (EL) display. The display 17 is installed on a display cart with a caster and is movable in the radiography room. The display 17 is connected to the console 14.

Figure 2:
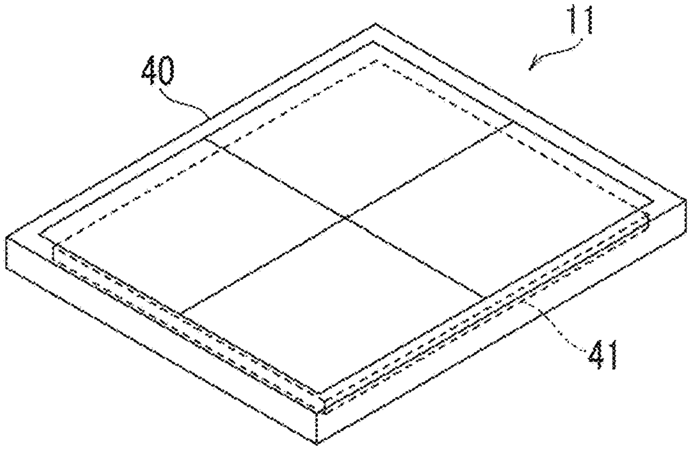
FIG. 2 is a diagram showing an example of a radiation detector.

As shown in FIG. 2, the radiation detector 11 has a housing 40 and a detection panel 41. The housing 40 has a flat, generally rectangular parallelepiped shape with a rectangular plane shape, and houses the detection panel 41 therein. Most of a front surface of the housing 40 is formed of a material transmitting the radiation R, such as carbon. The radiation detector 11 is set in the upright posture holder 27S or the decubitus posture holder 27L in a posture in which the front surface of the housing 40 faces the radiation source 10.

The detection panel 41 has a configuration in which a plurality of pixels that are sensitive to the radiation R or visible light converted from the radiation R by a scintillator to generate signal charges are arranged. In addition to the detection panel 41, a control device 18 described below is incorporated in the housing 40. In addition, a communication unit, a battery that supplies power to each unit, and the like are also incorporated in the housing 40. The radiation detector 11 may be a so-called computed radiography (CR) cassette in which an imaging plate is incorporated in place of the detection panel 41.

Figure 3:
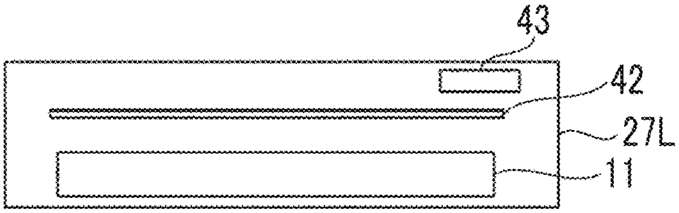
FIG. 3 is a side view showing an example of a decubitus posture holder.

FIG. 3 is a side view of the decubitus posture holder 27L in a case where an axial direction orthogonal to the paper surface in FIG. 1 is viewed as a visual line direction. As shown in FIG. 3, the decubitus posture holder 27L includes, in order from a radiation source 10 side (upper side in an example of FIG. 3), a space in which the grid 42 is accommodated and a space in which the radiation detector 11 is accommodated. The grid 42 removes scattered rays generated by the radiation R transmitted through the patient P. In a case in which the imaging operator captures a radiation image using the decubitus imaging table 15L, the radiation detector 11 is accommodated in the decubitus posture holder 27L. In addition, in this case, the imaging operator accommodates the grid 42 in the decubitus posture holder 27L as necessary.

In addition, the imaging apparatus 43 is provided at a position where the grid 42 of the decubitus posture holder 27L can be imaged. The imaging apparatus 43 comprises an image sensor such as a charge coupled device (CCD) image sensor or a complementary metal oxide semiconductor (CMOS) image sensor. The imaging apparatus 43 outputs an image (hereinafter, referred to as a "grid image") obtained by imaging the grid 42 to the console 14.

Figure 4:
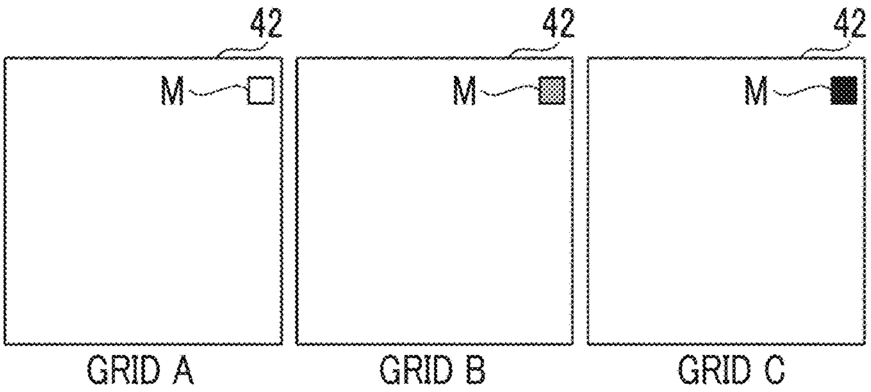
FIG. 4 is a plan view showing an example of a grid.

FIG. 4 is a plan view of the grid 42. As shown in FIG. 4, in the radiography system 2 according to the present embodiment, a plurality of types of grids 42 are prepared according to a combination of a grid ratio and a grid density. That is, the combination of the grid ratio and the grid density is different between the different types of grids 42.

The grid 42 has a flat, generally rectangular parallelepiped shape with a rectangular plane shape, and a marker M is provided at a determined position (in the example of FIG. 4, a position of an upper right end part) of a surface on an imaging apparatus 43 side in a state in which the grid 42 is installed in the decubitus posture holder 27L. The marker M is provided, for example, at a position outside an irradiation field of the radiation R. The marker M is rectangular, and the inside is filled with a color determined according to the type of the grid 42. That is, the type of the grid 42 can be identified by the color of the marker M. The imaging apparatus 43 is installed at least at a position where the marker M is within the angle of view. In addition, the grid 42 may not be used in the capture of the radiation image. In this case, since the marker M does not appear in the grid image, it is possible to discriminate the presence or absence of the grid 42 depending on the presence or absence of the marker M.

FIG. 4 shows an example of the decubitus posture holder 27L, but the upright posture holder 27S is also configured in the same manner as the decubitus posture holder 27L. That is, the upright posture holder 27S includes, in order from the radiation source 10 side, a space in which the grid 42 is accommodated and a space in which the radiation detector 11 is accommodated. In addition, in the upright posture holder 27S, the imaging apparatus 43 is installed at a position where at least the marker M is within the angle of view in a state in which the grid 42 is accommodated.

The shape of the marker M may be determined according to the type of the grid 42 instead of the color of the marker M. In this case, the type of the grid 42 can be identified by the shape of the marker M.

Figure 5:
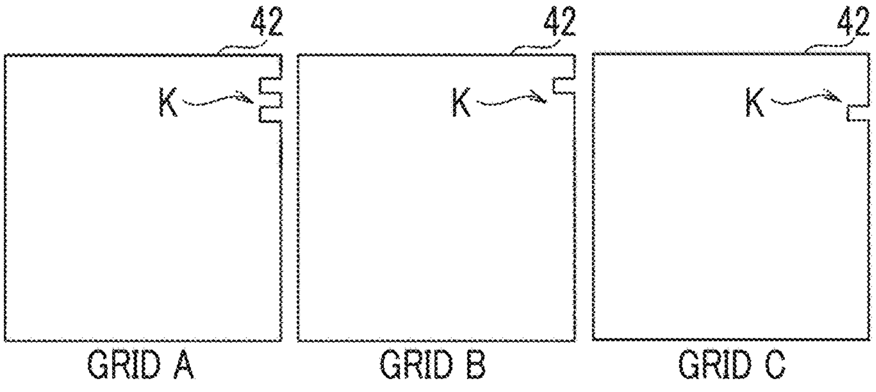
FIG. 5 is a plan view showing an example of a grid according to a modification example.

In addition, as shown in FIG. 5, the grid 42 may be provided with a notch K at a determined position (in the example of FIG. 5, a position of an upper right end part) of the plane instead of the marker M. The notch K has a shape corresponding to the type of the grid 42. That is, the type of the grid 42 can be identified by the shape of the notch K. In this form example, a photo interrupter may be provided instead of the imaging apparatus 43. In this case, the shape of the notch K can be specified by the output signal from the photo interrupter.

In addition, the grid 42 may not be provided with the marker M and the notch K. In this case, for example, the type of the grid 42 can be identified by imaging the grid 42 with an artificial intelligence (AI) camera and performing image recognition processing.

Figure 6:
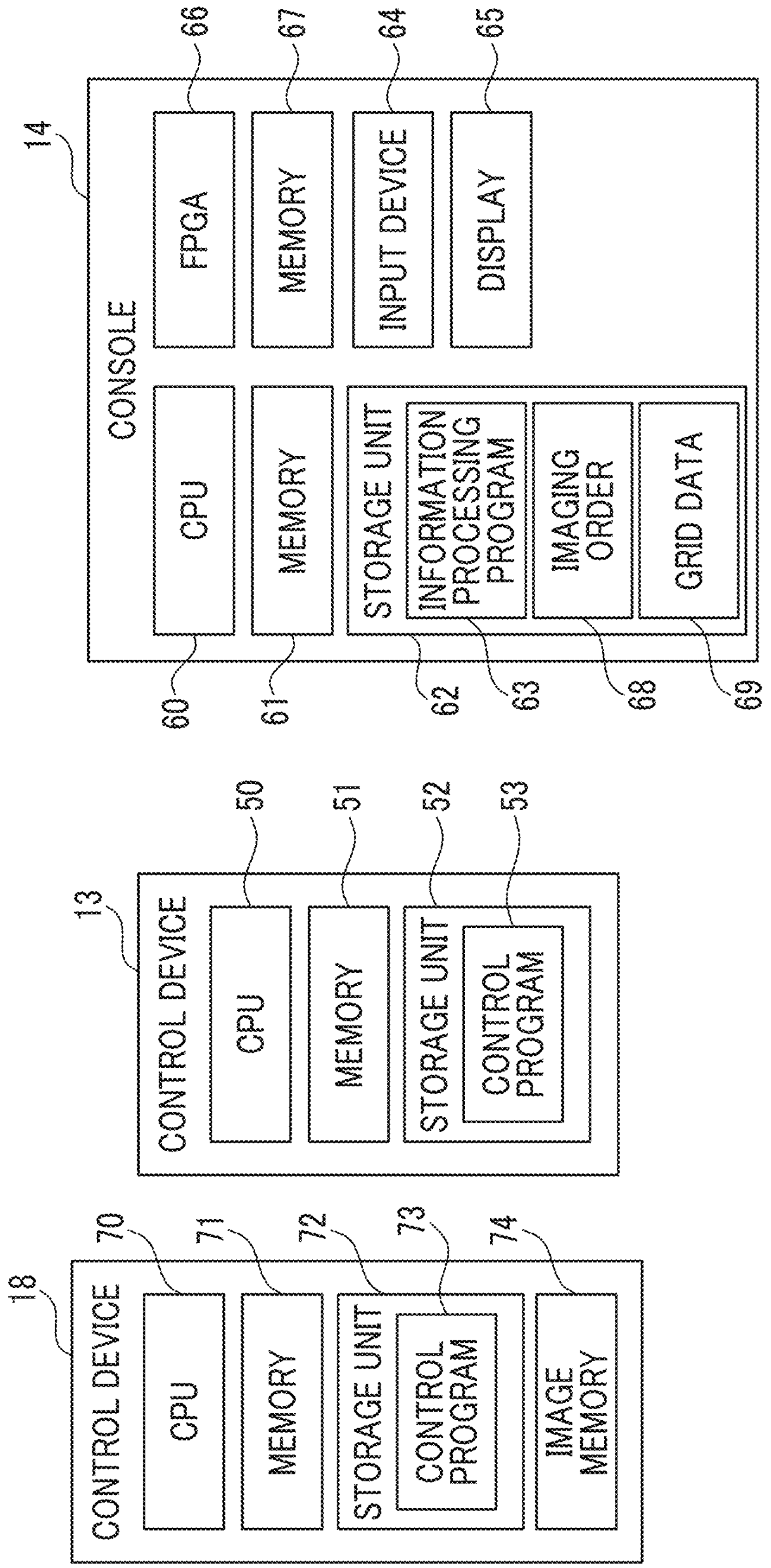
FIG. 6 is a block diagram showing an example of a hardware configuration of each device constituting the radiography system.

Next, a hardware configuration of the control device 13, the console 14, and the control device 18 will be described with reference to FIG. 6. As shown in FIG. 6, the control device 13 includes a central processing unit (CPU) 50, a memory 51 as a temporary storage area, and a non-volatile storage unit 52. The CPU 50 is an example of a processor.

The storage unit 52 is realized by a hard disk drive (HDD), a solid state drive (SSD), a flash memory, or the like. The storage unit 52 as a storage medium stores a control program 53. The CPU 50 reads out the control program 53 from the storage unit 52, loads the control program 53 into the memory 51, and executes the loaded control program 53.

The console 14 includes a CPU 60, a memory 61 used as a temporary storage area by the CPU 60, a non-volatile storage unit 62, an input device 64 such as a keyboard and a mouse, and a display 65 such as a liquid crystal display or an EL display. In addition, the console 14 further includes a field programmable gate array (FPGA) 66 and a memory 67 used as a temporary storage area by the FPGA 66. The CPU 60 and the FPGA 66 are examples of a processor. The FPGA 66 includes a logic circuit in which logic of image processing performed on the radiation image is programmed in advance.

The storage unit 62 is realized by an HDD, an SSD, a flash memory, or the like. An information processing program 63 is stored in the storage unit 62 as a storage medium. The CPU 60 reads out the information processing program 63 from the storage unit 62, loads the information processing program 63 into the memory 61, and executes the loaded information processing program 63. The information processing program 63 is an example of a radiography program according to the disclosed technology.

In addition, the storage unit 62 stores the imaging order 68 that is registered in advance. The imaging order 68 includes an imaging condition and an image processing condition in the radiographic imaging. In addition, the imaging order 68 includes patient information such as an age of the patient P, information on a physique of the patient P, and the imaging site. The imaging condition includes an imaging mode, an irradiation condition of the radiation R, a frame rate, a resolution of the image, and the like. In addition, the image processing condition includes a type of image processing executed by the FPGA 66 on the radiation image, a parameter of the image processing, and the like. In the present embodiment, the imaging mode is general imaging or fluoroscopy.

In addition, the storage unit 62 stores grid data 69. FIG. 7 shows an example of the grid data 69. As shown in FIG. 7, in the grid data 69 according to the present embodiment, information (hereinafter, referred to as "grid information") related to the grid 42 used in the capturing of the radiation image is associated with the presence or absence of the marker M and the color of the marker in a case in which the marker M is present. The grid information includes the presence or absence of the grid 42 and the type of the grid in a case where the grid 42 is present. In addition, in the grid information, the imaging mode, the imaging condition, and the image processing condition in a case in which the radiation image is captured without using the grid 42 or in a case in which the radiation image is captured using the corresponding type of the grid 42 are associated. In the present embodiment, the grid information and a set of the imaging mode, the imaging condition, and the image processing condition are associated with each other on a one-to-one basis.

The control device 18 includes a CPU 70, a memory 71 as a temporary storage area, a non-volatile storage unit 72, and an image memory 74. The CPU 70 is an example of a processor. The storage unit 72 is realized by an HDD, an SSD, a flash memory, or the like. The storage unit 72 as a storage medium stores a control program 73. The CPU 70 reads out the control program 73 from the storage unit 72, loads the control program 73 into the memory 71, and executes the loaded control program 73. The image memory 74 has a storage capacity capable of storing a predetermined number of radiation images.

Figure 8:
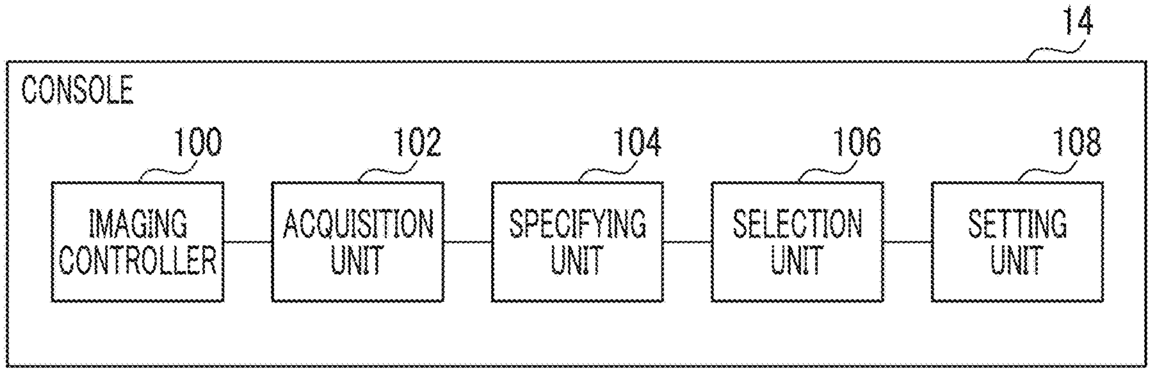
FIG. 8 is a block diagram showing an example of a functional configuration of a console.

Next, a functional configuration of the console 14 will be described with reference to FIG. 8. As shown in FIG. 8, the console 14 includes an imaging controller 100, an acquisition unit 102, a specifying unit 104, a selection unit 106, and a setting unit 108. The CPU 60 executes the information processing program 63 to function as the imaging controller 100, the acquisition unit 102, the specifying unit 104, the selection unit 106, and the setting unit 108.

The imaging controller 100 performs control to cause the imaging apparatus 43 to capture a grid image. The acquisition unit 102 acquires the grid image captured under the control of the imaging controller 100 from the imaging apparatus 43.

The specifying unit 104 specifies the grid information based on the grid image acquired by the acquisition unit 102. Specifically, the specifying unit 104 specifies the grid information corresponding to the presence or absence of the marker M in the grid image and the color of the marker M in a case where the marker M is present in the grid image, with reference to the grid data 69.

The selection unit 106 selects the imaging mode, the imaging condition, and the image processing condition corresponding to the grid information specified by the specifying unit 104, with reference to the grid data 69. That is, the selection unit 106 selects fluoroscopy or general imaging associated with the grid information as the imaging mode of the radiation image.

The setting unit 108 sets the imaging mode selected by the selection unit 106 as the imaging mode of the radiation image. In addition, the setting unit 108 sets the imaging condition selected by the selection unit 106 as the imaging condition in the imaging mode selected by the selection unit 106, based on the grid information. In addition, the setting unit 108 sets the image processing condition selected by the selection unit 106 as the image processing condition in the imaging mode selected by the selection unit 106, based on the grid information.

In the present embodiment, in a case in which the radiation image is captured, the imaging mode, the imaging condition, and the image processing condition registered as the imaging order 68 are used. Therefore, the setting unit 108 according to the present embodiment sets the imaging mode, the imaging condition, and the image processing condition by updating the imaging order 68 using the imaging mode, the imaging condition, and the image processing condition selected by the selection unit 106 based on the grid information. That is, the imaging order 68 after the update by the setting unit 108 includes the imaging mode, the imaging condition, and the image processing condition selected by the selection unit 106 based on the grid information.

For example, in a case where there are setting values for setting the imaging mode and the imaging condition in the control device 13 and the control device 18, the setting unit 108 may set the imaging mode and the imaging condition by outputting an instruction to set the imaging mode and the imaging condition selected by the selection unit 106 as the setting values to the control device 13 and the control device 18. In addition, for example, in a case where a set value for setting the image processing condition is present in the FPGA 66, the setting unit 108 may set the image processing condition by outputting an instruction to set the image processing condition selected by the selection unit 106 as the set value to the FPGA 66.

Figure 9:
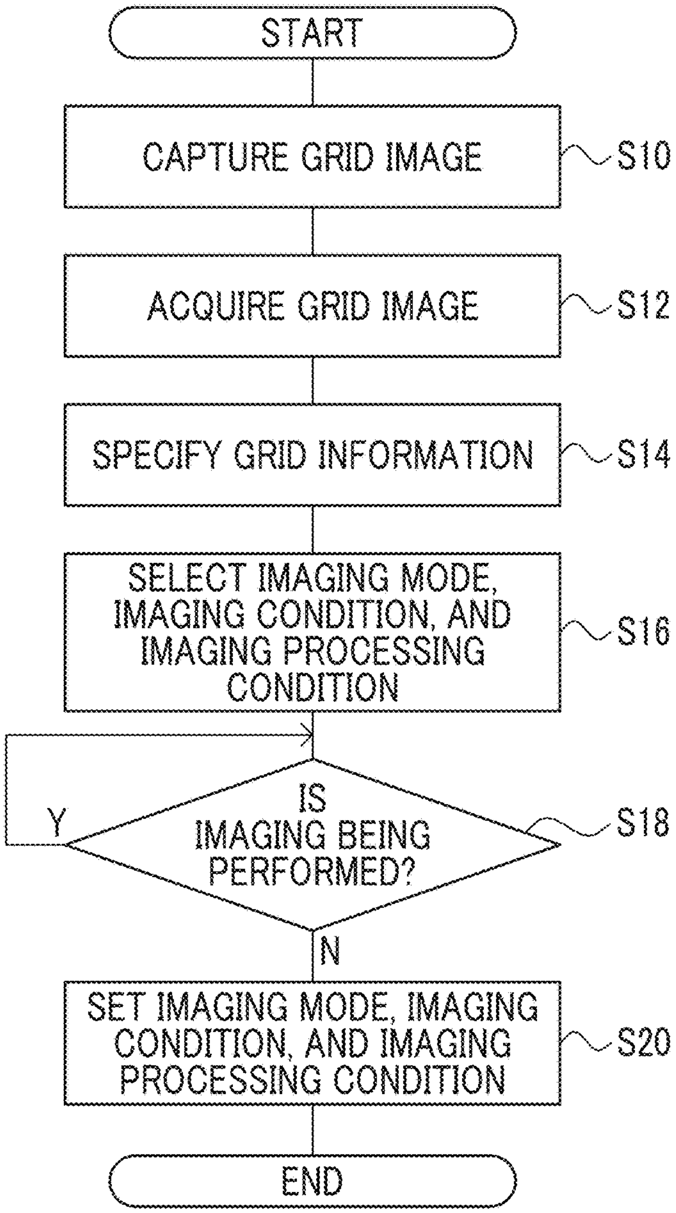
FIG. 9 is a flowchart showing an example of imaging mode setting processing.

Next, an action of the console 14 will be described with reference to FIG. 9. The CPU 60 executes the information processing program 63 to execute the imaging mode setting processing shown in FIG. 9.

In step S10, the imaging controller 100 performs control to cause the imaging apparatus 43 to capture the grid image. In step S12, the acquisition unit 102 acquires the grid image captured by the control of the processing of step S10 from the imaging apparatus 43. In step S14, the specifying unit 104 specifies the grid information based on the grid image acquired in step S12, as described above.

In step S16, the selection unit 106 selects the imaging mode, the imaging condition, and the image processing condition corresponding to the grid information specified in step S14, with reference to the grid data 69. In step S18, the setting unit 108 waits until the imaging is ended in a case in which the radiation image is being captured. The processing of step S18 may not be executed.

In step S20, as described above, the setting unit 108 sets the imaging mode, the imaging condition, and the image processing condition by updating the imaging order 68 using the imaging mode, the imaging condition, and the image processing condition selected in step S16. In a case where the processing of step S20 is ended, the imaging mode setting processing is ended. The radiation image is captured according to the imaging mode, the imaging condition, and the image processing condition set as described above.

As described above, according to the present embodiment, in a case in which the imaging operator accommodates the grid 42 and the radiation detector 11 in the upright posture holder 27S or the decubitus posture holder 27L, the imaging mode, the imaging condition, and the image processing condition are automatically set. Therefore, it is possible to suppress a decrease in the efficiency of the radiographic imaging.

In the above-described embodiment, a case where the specifying unit 104 specifies the grid information based on the grid image acquired by the acquisition unit 102 has been described, but the disclosed technology is not limited to this aspect. For example, the specifying unit 104 may specify the grid information based on the output of the sensor for discriminating the grid 42. A form example of the sensor in this embodiment includes a weight sensor that measures a weight of the grid 42. In this case, the specifying unit 104 specifies the grid information based on the weight measured by the weight sensor.

Figure 11:
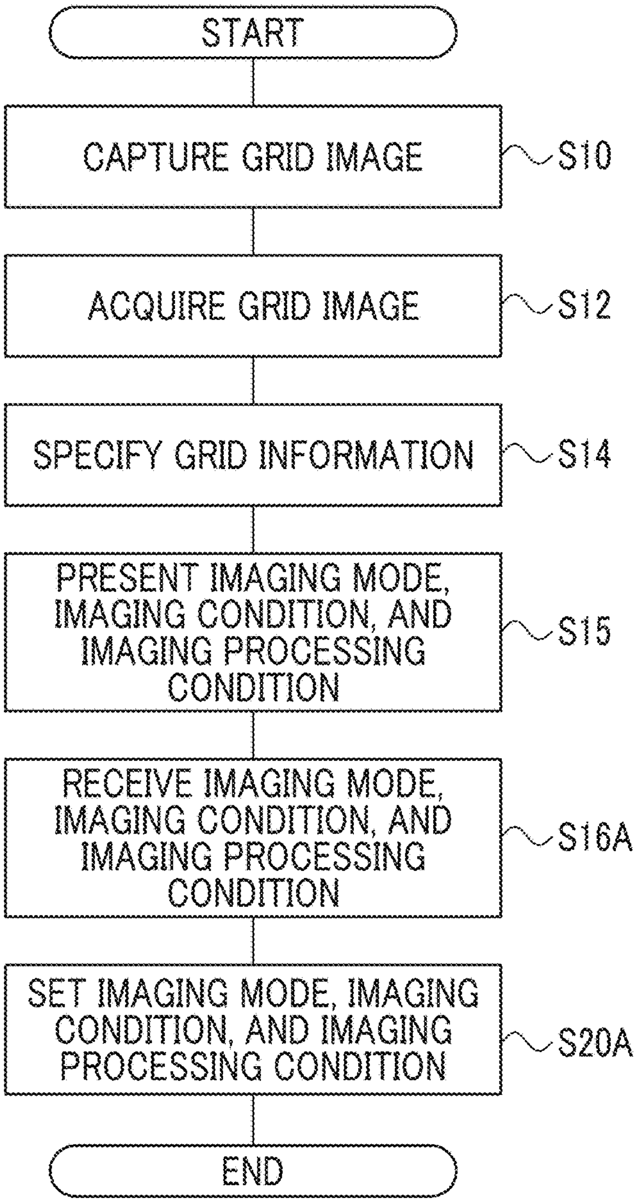
FIG. 11 is a flowchart showing an example of imaging mode setting processing according to a modification example.

In addition, in the above-described embodiment, a case where the grid information and a set of the imaging mode, the imaging condition, and the image processing condition are associated with each other in a one-to-one basis has been described, but the disclosed technology is not limited to this aspect. A plurality of different imaging conditions or image processing conditions may be associated with one type of grid. FIG. 10 shows an example of the grid data 69 in this form example. As shown in FIG. 10, in the grid data 69 in this form example, a plurality of different sets of imaging modes, imaging conditions, and image processing conditions are associated with the grid information related to one type of grid 42. In addition, FIG. 11 shows an example of imaging mode setting processing in this form example. In FIG. 11, steps executing the same processing as FIG. 9 will be designated by the same reference numerals and will not be described here.

Figure 12:
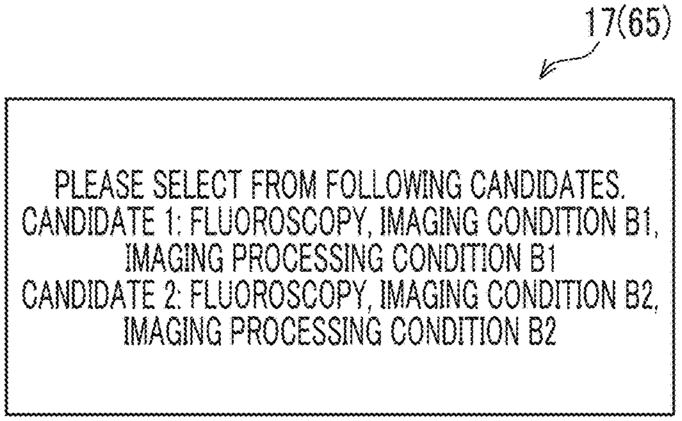
FIG. 12 is a diagram showing an example of a condition presentation screen according to a modification example.

In step S15 of FIG. 11, the CPU 60 refers to the grid data 69 and performs control to display the plurality of sets of the imaging modes, imaging conditions, and image processing conditions associated with the grid information specified in step S14 on at least one of the display 17 or the display 65. With this control, the CPU 60 presents a plurality of imaging modes, imaging conditions, and image processing conditions to the imaging operator who is the user. FIG. 12 shows an example of a condition presentation screen presented to the imaging operator by this control. As shown in FIG. 12, on the condition presentation screen in this form example, a plurality of sets of imaging modes, imaging conditions, and image processing conditions, and a message prompting the imaging operator to select one set of the imaging mode, the imaging condition, and the image processing condition are displayed.

The imaging operator selects one set of the imaging mode, the imaging condition, and the image processing condition from the plurality of sets of the imaging modes, the imaging conditions, and the image processing conditions displayed on the display 17 or the display 65. This selection is performed, for example, in a case where the display 17 or the display 65 is a touch panel display, via a touch panel. In step S16A, the CPU 60 receives the one set of the imaging mode, the imaging condition, and the image processing condition selected by the imaging operator via the condition presentation screen presented in step S15. In step S20A, the setting unit 108 sets the imaging mode, the imaging condition, and the image processing condition received in step S16A, in the same manner as in step S20.

FIG. 13 shows another example of the grid data 69 in the form example in which a plurality of different imaging conditions or image processing conditions are associated with one type of grid. As shown in FIG. 13, in the grid data 69 in this form example, a plurality of different sets of imaging modes, imaging conditions, and image processing conditions are associated with the grid information related to one type of grid 42. In addition, in the grid data 69 in this form example, one piece of grid information and one set of the imaging mode, the imaging condition, and the image processing condition are associated with the combination of the presence or absence of one marker and the color of the marker. In this form example, the specifying unit 104 specifies one set of the imaging mode, the imaging condition, and the image processing condition from a plurality of sets of the imaging modes, imaging conditions, and image processing conditions associated with one piece of grid information based on the grid image.

In addition, at least one of the functional units provided in the console 14 in the above-described embodiment may be provided in the control device 13 or the control device 18.

In addition, in the above-described embodiment, for example, various processors shown below can be used as a hardware structure of a processing unit that executes various types of processing, such as each functional unit of the console 14. The various processors include, in addition to a CPU that is a general-purpose processor functioning as various processing units by executing software (program) as described above, a programmable logic device (PLD) that is a processor whose circuit configuration can be changed after manufacture such as an FPGA, a dedicated electric circuit that is a processor having a circuit configuration dedicatedly designed to execute specific processing such as an application specific integrated circuit (ASIC), and the like.

One processing unit may be composed of one of the various processors or may be composed of a combination of two or more processors of the same type or different types (for example, a combination of a plurality of FPGAs or a combination of a CPU and an FPGA). In addition, a plurality of processing units may be composed of one processor.

As an example of the plurality of processing units composed of one processor, first, as represented by a computer such as a client and a server, a form of one processor that is composed of a combination of one or more CPUs and software and that functions as the plurality of processing units is possible. Second, as represented by a system on chip (SoC) or the like, there is a form in which a processor that realizes functions of an entire system including a plurality of processing units with one integrated circuit (IC) chip is used. Accordingly, various processing units are configured using one or more of the various processors as the hardware structure.

Furthermore, more specifically, an electric circuit (circuitry) in which circuit elements such as semiconductor elements are combined can be used as the hardware structure of the various processors.

In the above-described embodiment, an aspect in which various programs are stored (installed) in the storage unit in advance has been described, but the present disclosure is not limited thereto. The various programs may be provided in a form of being recorded on a recording medium such as a compact disc read only memory (CD-ROM), a digital versatile disc read only memory (DVD-ROM), and a Universal Serial Bus (USB) memory. The various programs may be provided in a form of being downloaded from an external device via a network.

What is claimed is:

1. A radiography system capable of executing fluoroscopy in which a plurality of radiation images are continuously captured at a predetermined frame rate and general imaging in which one radiation image is recorded in a switchable manner, the radiography system comprising at least one processor, wherein the at least one processor is configured to:

obtain information related to a grid based on an image obtained by imaging the grid; and select the fluoroscopy or the general imaging as an imaging mode based on the information related to the grid used in capturing the plurality of radiation images or the one radiation image.

2. The radiography system according to claim 1, wherein the at least one processor is configured to set, based on the information related to the grid, an imaging condition in the selected imaging mode or an image processing condition for a radiation image obtained by imaging in the selected imaging mode.

3. The radiography system according to claim 1, wherein the at least one processor is configured to specify the information related to the grid based on an image obtained by imaging the grid or an output of a sensor for discriminating the grid.

4. The radiography system according to claim 2, wherein:

the information related to the grid includes a type of the grid, a plurality of different imaging conditions or a plurality of different image processing conditions are associated with one type of grid, and the at least one processor is configured to specify one imaging condition or one image processing condition from among the plurality of imaging conditions or the plurality of image processing conditions associated with the type of the grid based on an image obtained by imaging the grid.

5. The radiography system according to claim 2, wherein:

the information related to the grid includes a type of the grid, a plurality of different imaging conditions or a plurality of different image processing conditions are associated with one type of the grid, and the at least one processor is configured to:

present the plurality of imaging conditions or the plurality of image processing conditions associated with a specified type of the grid to a user;

receive one imaging condition or one image processing condition selected by the user; and set the received imaging condition or the received image processing condition.

6. A radiography method for a radiography system that includes at least one processor and is capable of executing fluoroscopy in which a plurality of radiation images are continuously captured at a predetermined frame rate and general imaging in which one radiation image is recorded in a switchable manner, the radiography method comprising, by the at least one processor:

obtaining information related to a grid based on an image obtained by imaging the grid; and selecting the fluoroscopy or the general imaging as an imaging mode based on the information related to the grid used in capturing the plurality of radiation images or the one radiation image.

7. A non-transitory computer-readable storage medium storing a radiography program for a radiography system that includes at least one processor and is capable of executing fluoroscopy in which a plurality of radiation images are continuously captured at a predetermined frame rate and general imaging in which one radiation image is recorded in a switchable manner, the radiography program being executable by the at least one processor to execute perform processing comprising:

obtaining information related to a grid based on an image obtained by imaging the grid; and selecting the fluoroscopy or the general imaging as an imaging mode based on the information related to the grid used in capturing the plurality of radiation images or the one radiation image.

* * * * *